(12) United States Patent
Kurumatani

(10) Patent No.: US 9,016,911 B2
(45) Date of Patent: Apr. 28, 2015

(54) BICYCLE LIGHT

(71) Applicant: Cateye Co., Ltd., Osaka (JP)

(72) Inventor: Nami Kurumatani, Osaka (JP)

(73) Assignee: Cateye Co., Ltd., Osaka (JP)

(*) Notice: Subject to any disclaimer, the term of this patent is extended or adjusted under 35 U.S.C. 154(b) by 0 days.

(21) Appl. No.: 14/066,083

(22) Filed: Oct. 29, 2013

(65) Prior Publication Data

US 2014/0355283 A1    Dec. 4, 2014

(30) Foreign Application Priority Data

Jun. 4, 2013   (JP) ................. 2013-117796

(51) Int. Cl.
| | | |
|---|---|---|
| *B62J 6/00* | (2006.01) | |
| *B62J 6/02* | (2006.01) | |
| *B62J 6/16* | (2006.01) | |
| *F21L 4/00* | (2006.01) | |
| *F21V 21/08* | (2006.01) | |
| *F21V 23/04* | (2006.01) | |
| *F21Y 101/02* | (2006.01) | |

(52) U.S. Cl.
CPC .... *B62J 6/00* (2013.01); *B62J 6/02* (2013.01); *B62J 6/16* (2013.01); *F21L 4/005* (2013.01); *F21V 21/0816* (2013.01); *F21V 23/0414* (2013.01); *F21Y 2101/02* (2013.01)

(58) Field of Classification Search
USPC ................... 362/474, 473, 475, 476
See application file for complete search history.

(56) References Cited

U.S. PATENT DOCUMENTS

| | | | | |
|---|---|---|---|---|
| 7,293,900 | B1 * | 11/2007 | Lee .............................. | 362/476 |
| 7,594,741 | B2 * | 9/2009 | Okajima et al. .............. | 362/473 |
| 7,717,595 | B2 * | 5/2010 | Fan .............................. | 362/474 |
| 2009/0268436 | A1 | 10/2009 | Taiga | |
| 2012/0170295 | A1 | 7/2012 | Ellenburg et al. | |

FOREIGN PATENT DOCUMENTS

| | | |
|---|---|---|
| CN | 202657161 U | 1/2013 |
| DE | 29917535 U1 | 1/2000 |
| EP | 1790556 A1 | 5/2007 |
| EP | 1810916 A1 | 7/2007 |
| JP | 2009266630 | 11/2009 |
| WO | WO2008/121683 A1 | 10/2008 |

\* cited by examiner

*Primary Examiner* — Anabel Ton
(74) *Attorney, Agent, or Firm* — Arnstein & Lehr

(57) ABSTRACT

A bicycle light includes a body and a fixture tool for fixing the body to a bicycle. The body includes a light-emitting portion, a substrate unit having an electronic circuit controlling a light-emitting state of the light-emitting portion, a lens for obtaining desired light distribution from light received from the light-emitting portion, a lens cover, a battery case and a battery lid forming a closed space for storing the light-emitting portion and the substrate unit, a bar switch relatively movable with respect to the substrate unit for varying the operational state of the electronic circuit by partially pressing the substrate unit and a guide hole guiding movement of the bar switch. The fixture tool includes a contact portion coming into contact with the bar switch for moving the bar switch and a flexible portion for pivoting the body on the fixture tool.

7 Claims, 4 Drawing Sheets

BICYCLE LIGHT

BACKGROUND OF THE INVENTION

1. Field of the Invention

The present invention relates to a bicycle light, and more particularly, it relates to a bicycle light including a body and a fixture tool for fixing the body to a bicycle.

2. Description of the Background Art

A portable miniature light emitting light with a built-in battery is known in general.

For example, U.S. Patent Application Publication No. 2009/0268436 discloses a miniature light including a flat bottomed cylindrical casing (1) having a circular opening on a central portion of the surface thereof, a flat battery (2) stored in a bottom portion of the casing (1), a discoidal circuit board (3), arranged/stored on the battery (2) of the casing (1), loaded with an LED, a control portion and a push switch on the side of the surface thereof, an LED cover (4) having a transparent dome portion covering the LED and an annular flange portion extending outward from an opening provided in a bottom portion thereof so that the dome portion projects from the opening of the casing (1) and the flange portion is arranged/stored on the circuit board (3) and an outer cover (5) of an elastomer material having a waterproof portion covering the outer surface of the casing (1) and a pair of fitting pieces extending from a bottom portion thereof, in which the push switch is arranged on an outer peripheral portion of the circuit board to come into contact with the flange portion.

A bicycle light fixed to a bicycle is operated during pedaling, and hence particularly high operability is required thereto. Further improvement of operability is required also to the miniature light described in U.S. Patent Application Publication No. 2009/0268436.

In the miniature light described in U.S. Patent Application Publication No. 2009/0268436, the outer cover (5) of an elastomer material must be stretched out, in order to take out the casing (1) therefrom. Therefore, it follows that the outer cover (5) is remarkably stretched out every battery exchange required substantially every 100 to 200 hours. While the outer cover (5) must be strongly adhered to the casing (1) in order to keep the miniature light watertight for obtaining waterproofness, it is difficult to take out the casing (1) from the outer cover (5) if adhesiveness therebetween is increased, and hence a long time is required for battery exchange. In other words, improvement of waterproofness leads to complicated battery exchange while avoidance of complicated battery exchange leads to reduction of waterproofness with the outer cover (5) in the miniature light described in U.S. Patent Application Publication No. 2009/0268436.

SUMMARY OF THE INVENTION

An object of the present invention is to provide a bicycle light achieving high operability and waterproofness.

The bicycle light according to the present invention includes a body and a fixture tool for fixing the body to a bicycle. The body includes a light-emitting portion, a substrate having an electronic circuit controlling a light-emitting state of the light-emitting portion in response to an operational state, a lens for obtaining desired light distribution from light received from the light-emitting portion, a housing forming a closed space for storing the light-emitting portion and the substrate, a bar-shaped member relatively movable with respect to the substrate for varying the operational state of the electronic circuit by partially pressing the substrate, and a guide portion guiding movement of the bar-shaped member. The fixture tool includes a contact portion coming into contact with the bar-shaped portion for moving the bar-shaped member and a flexible portion for pivoting the body on the fixture tool.

According to an aspect of the present invention, the contact portion and the flexible portion are separate from each other by 180 degrees in the circumferential direction of the lens in the aforementioned bicycle light.

According to another aspect of the present invention, the guide portion is constituted of the inner peripheral surface of a hole formed in the housing in the aforementioned bicycle light.

According to still another aspect of the present invention, the fixture tool includes a base, having a hook portion, provided with the contact portion and a band of an elastomer material engaging with the hook portion in the aforementioned bicycle light. According to a further aspect of the present invention, the bar-shaped member has a large-diametral portion partially pressing the substrate and a small-diametral portion exposed outward from the closed space in the aforementioned bicycle light.

According to a further aspect of the present invention, a step portion is formed between the large-diametral portion and the small-diametral portion and a sealing member for sealing the closed space is provided on the step portion in the aforementioned bicycle light.

According to a further aspect of the present invention, the aforementioned bicycle light further includes a battery for supplying power to the electronic circuit. The housing has a storage hole storing the battery, the battery, the housing and the storage hole have circular plane shapes, the circular storage hole is eccentric to the circular housing, and the bar-shaped member is arranged on a side farther from the center of the storage hole.

According to the present invention, a bicycle light achieving high operability and waterproofness can be obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described. In the following description, identical or corresponding portions are denoted by the same reference signs, and redundant description may not be repeated.

When numbers or quantities are mentioned in the embodiment described below, the scope of the present invention is not necessarily restricted to the numbers or the quantities, unless otherwise stated. In the embodiment described below, further, respective components are not necessarily requisite for the present invention, unless otherwise stated.

Figure 1:
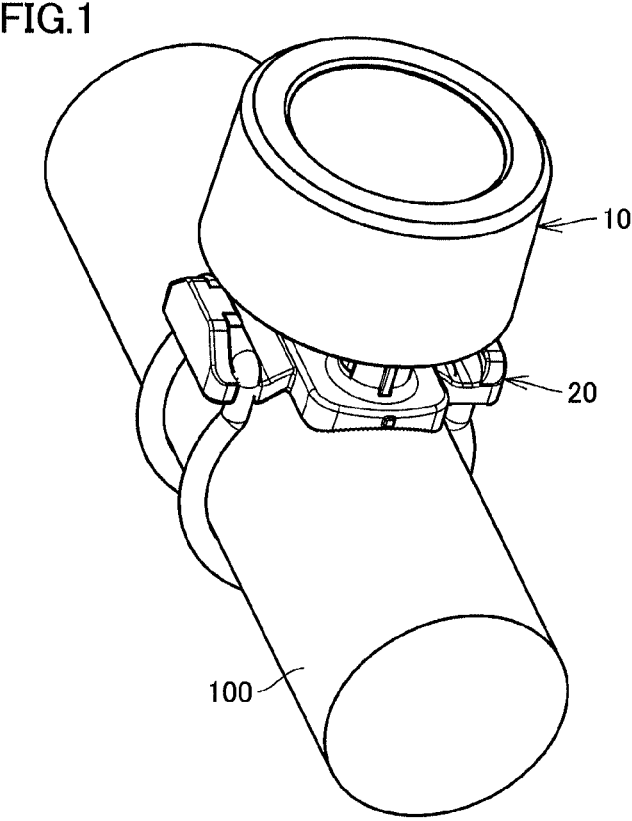
FIG. 1 illustrates a bicycle light according to an embodiment of the present invention in a state mounted on a bar of a bicycle.

FIG. 1 illustrates a bicycle light according to the embodiment of the present invention in a state mounted on a bar 100 of a bicycle. As shown in FIG. 1, the bicycle light according to this embodiment includes a body 10 and a fixture tool 20 for fixing body 10 to bar 100 of the bicycle.

Bar 100 of the bicycle may be a handlebar, a frame or a stem of the bicycle.

Figure 2:
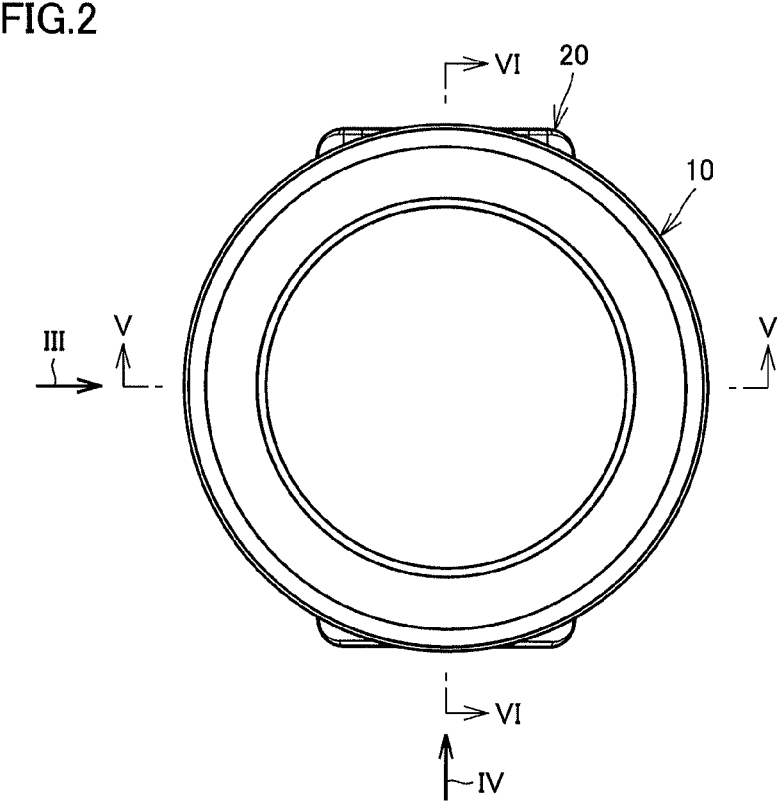
FIG. 2 is a top plan view of the bicycle light according to the embodiment of the present invention.
Figure 3:
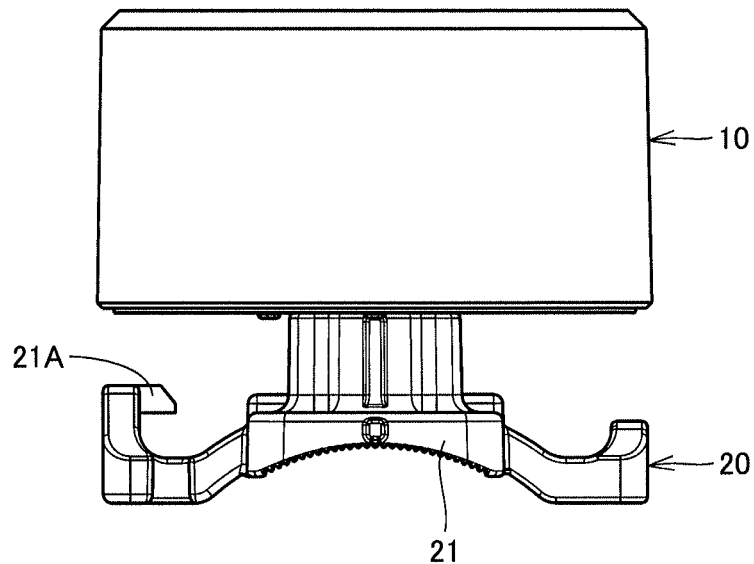
FIG. 3 illustrates the bicycle light shown in FIG. 2 as viewed along arrow III.
Figure 4:
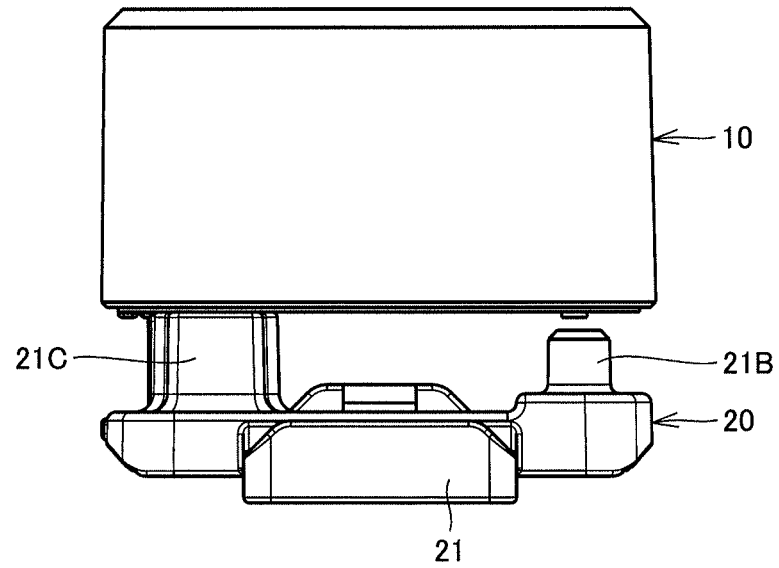
FIG. 4 illustrates the bicycle light shown in FIG. 2 as viewed along arrow IV.
Figure 5:
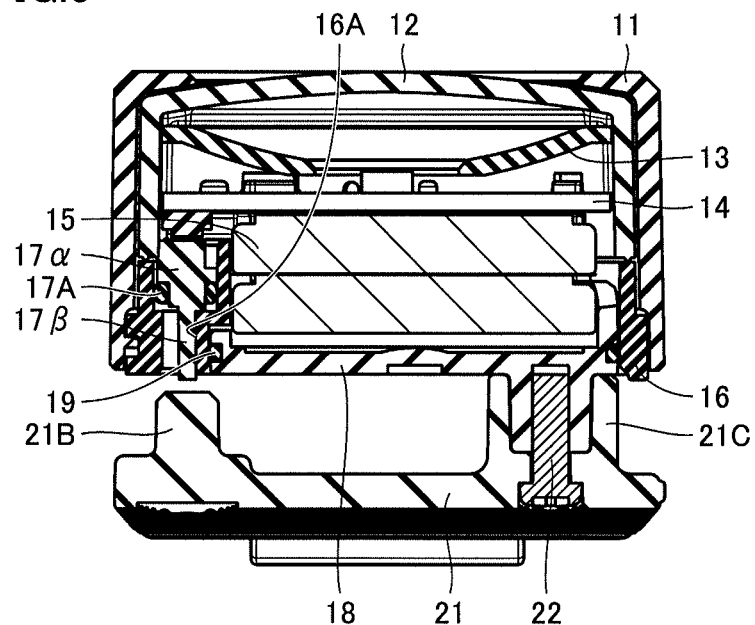
FIG. 5 is a sectional view of the bicycle light taken along the line V-V in FIG. 2.
Figure 6:
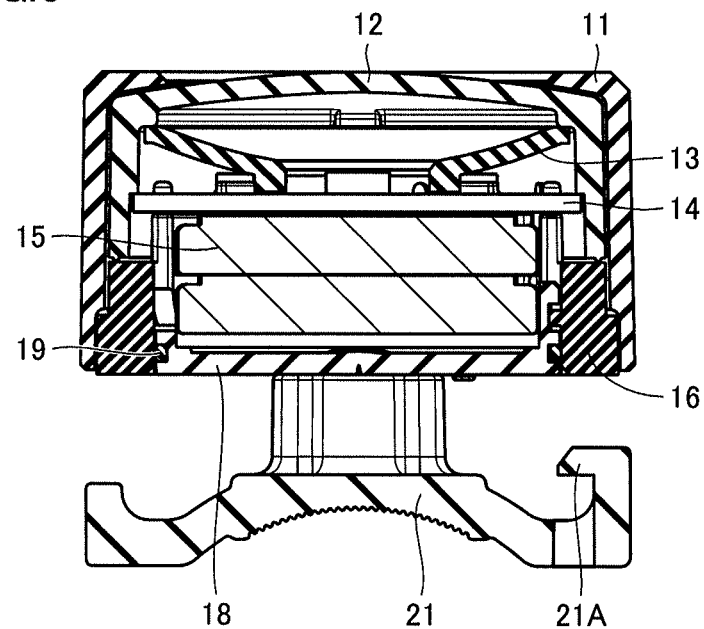
FIG. 6 is a sectional view of the bicycle light taken along the line VI-VI in FIG. 2.
Figure 7:
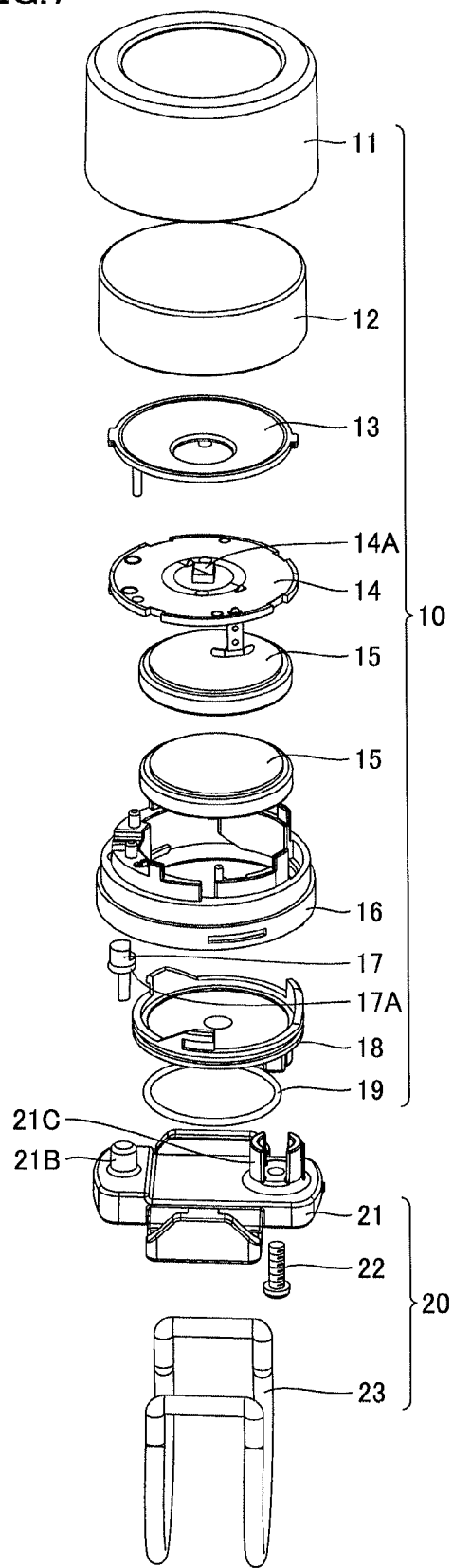
FIG. 7 is an exploded perspective view of the bicycle light according to the embodiment of the present invention.

The structure of the bicycle light according to this embodiment is now described with reference to FIGS. 2 to 7. FIG. 2 is a top plan view of the bicycle light according to this embodiment, FIGS. 3 and 4 illustrate the bicycle light as viewed along arrows III and IV respectively, and FIGS. 5 and 6 are sectional views of the bicycle light taken along the lines V-V and VI-VI in FIG. 2 respectively. FIG. 7 is an exploded perspective view of the bicycle light according to this embodiment.

Body 10 includes a lens cover 11, a lens 12, a reflector 13, a substrate unit 14, a light-emitting portion 14A, a battery 15, a battery case 16, a guide hole 16A, a bar member such as bar switch 17, O-rings 17A and 19, and a battery lid 18.

Lens cover 11, lens 12, battery case 16 and battery lid 18 form a closed space for storing light-emitting portion 14A and substrate unit 14. Lens 12 functions to pass light received from light-emitting portion 14A therethrough for obtaining desired light distribution. Substrate unit 14 has an electronic circuit controlling a light-emitting state of light-emitting portion 14 in response to an operational state thereof. Light-emitting portion 14A is constituted of an LED, for example.

Bar switch 17 is relatively movable with respect to substrate unit 14, and varies the operational state of the electronic circuit on substrate unit 14 by pressing a push switch formed on the rear surface of substrate unit 14. The light-emitting state (turned on, blinking, turned off or the like) of light-emitting portion 14A depends on the operational state of the electronic circuit. Battery case 16 includes guide hole 16A for guiding movement of bar switch 17.

Bar switch 17 has a large-diametral portion 17α partially pressing substrate unit 14 in the closed space and a small-diametral portion 17β exposed outward from the closed space. A step is formed between large-diametral portion 17a and small-diametral portion 17β, and O-ring 17A for sealing the closed space is provided on this step.

Battery case 16 has a storage hole storing battery 15. According to this embodiment, battery 15 and battery case 16 have circular plane shapes, and the storage hole for battery 15 is eccentric to battery case 16. Bar switch 17 is arranged on a side farther from the center of battery 15.

Fixture tool 20 includes a base 21 of resin, a screw 22 and a band 23 of an elastomer material. Base 21 includes a hook portion 21A, a contact portion 21B and a flexible portion 21C.

Band 23 engages with hook portion 21A. Contact portion 21B projects from base 21 toward body 10. Flexible portion 21C is formed by cylindrical walls projecting from base 21 toward body 10, as shown in FIG. 7. Body 10 partially engages with the inner peripheries of the cylindrical walls, and is bonded to fixture tool 20 with screw 22.

Contact portion 21B and flexible portion 21C are formed to line up with each other in the diametral direction of lens 12. In order to operate the electronic circuit with bar switch 17, body 10 positioned above contact portion 21B is pressed downward. Flexible portion 21C engages with body 10. Body 10 engaging with flexible portion 21C and base 21 of fixture tool 20 are fixed to each other with screw 22. Body 10 is pivotable on fixture tool 20, due to the clearance between body 10 and flexible portion 21C engaging with each other and deflection of screw 22. In other words, body 10 pivots upon flexible portion 21C on fixture tool 20.

Contact portion 21B comes into contact with bar switch 17, to move bar switch 17. Thus, bar switch 17 is thrust into body 10 to press the push switch provided on the rear surface of substrate unit 14, thereby varying the light-emitting state of light-emitting portion 14A. Band 23 engages with hook portion 21A formed on base 21.

In the bicycle light according to this embodiment, the light-emitting state of light-emitting portion 14A can be controlled by relatively moving bar switch 17 with respect to substrate unit 14 and partially pressing substrate unit 14 thereby varying the operational state of the electronic circuit, whereby the size (the area in plan view) of a movable portion with respect to the closed space formed by lens cover 11 and the like can be reduced. Consequently, sealability of the closed space storing battery 15 and the like is improved, to implement high waterproofness. Further, guide hole 16A guiding the relative movement of bar switch 17 with respect to substrate unit 14 is provided on battery case 16, whereby the operation of varying the operational state of the electronic circuit is easy to perform, and operability of the bicycle light is improved. Thus, the bicycle light according to this embodiment achieves high waterproofness and operability.

In the bicycle light according to this embodiment, body 10 pivots upon flexible portion 21C on fixture tool 20. Contact portion 21B and flexible portion 21C are separate from each other by 180 degrees in the circumferential direction of lens 12, whereby movement of bar switch 17 with respect to deformation of flexible portion 21C is increased. Consequently, the operation of varying the operational state of the electronic circuit is easy to perform, and the operability can be further improved.

In the bicycle light according to this embodiment, substrate unit 14 can be reliably pressed with large-diametral portion 17α of bar switch 17, whereby higher operability can be obtained with small malfunction. Further, small-diametral portion 17β of bar switch 17 is so exposed outward from the closed space as to reduce the size of the exposed portion, whereby the waterproofness can be improved.

In the bicycle light according to this embodiment, the storage hole for battery 15 is eccentric to battery case 16 and bar switch 17 is arranged on the side farther from the center of the eccentric storage hole, whereby bar switch 17 can be provided in a relatively large space formed on a side of the storage hole, a plane space exhibits high utilizability, and body 10 can be miniaturized.

Contact portion 21B and flexible portion 21 C of fixture tool 20 may not necessarily be separate from each other by 180 degrees in the circumferential direction of lens 12. Further, the mode of the "guide portion" is not restricted to guide hole 16A formed in battery case 16. Base 21 and band 23 of fixture tool 20 may be integrally formed.

Bar switch 17 is not restricted to the kind of bar switch including large-diametral portion 17α and small-diametral portion 17β. Further, the boundary between large-diametral portion 17α and small-diametral portion 17β is not restricted to the step shown in FIG. 5 either, but may have a tapered shape, for example.

The eccentricity of the storage hole of battery 15 to battery case 16 is also illustrative matter in this embodiment, and the scope of the present invention is not restricted to this.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A bicycle light comprising a body and a fixture tool for fixing the body to a bicycle, wherein
the body includes:
a light-emitting portion;
a substrate having an electronic circuit controlling a light-emitting state of the light-emitting portion in response to an operational state;
a lens for obtaining desired light distribution from light received from the light-emitting portion;
a housing forming a closed space for storing the light-emitting portion and the substrate;
a bar-shaped member relatively movable with respect to the substrate for varying the operational state of the electronic circuit by partially pressing the substrate; and
a guide portion guiding movement of the bar-shaped member, and
the fixture tool includes:
a contact portion coming into contact with the bar-shaped member for moving the bar-shaped member; and
a flexible portion for pivoting the body on the fixture tool.

2. The bicycle light according to claim 1, wherein
the contact portion and the flexible portion are separate from each other by 180 degrees in the circumferential direction of the lens.

3. The bicycle light according to claim 1, wherein
the guide portion is constituted of the inner peripheral surface of a hole formed in the housing.

4. The bicycle light according to claim 1, wherein
the fixture tool includes a base, having a hook portion, provided with the contact portion and a band of an elastomer material engaging with the hook portion.

5. The bicycle light according to claim 1, wherein
the bar-shaped portion has a large-diametral portion partially pressing the substrate and a small-diametral portion exposed outward from the closed space.

6. The bicycle light according to claim 5, wherein
a step portion is formed between the large-diametral portion and the small-diametral portion, and a sealing member for sealing the closed space is provided on the step portion.

7. The bicycle light according to claim 1, further comprising a battery for supplying power to the electronic circuit, wherein
the housing has a storage hole storing the battery,
the battery, the housing and the storage hole have circular plane shapes, and
the circular storage hole is eccentric to the circular housing, and the bar-shaped member is arranged on a side farther from the center of the storage hole.

* * * * *